Aug. 19, 1941.   R. ENTRIKEN   2,253,328
DAMPER REGULATOR
Filed May 17, 1939   3 Sheets-Sheet 1

WITNESS:
Robt R. Kitchel.

Ralph Entriken
BY
ATTORNEYS.

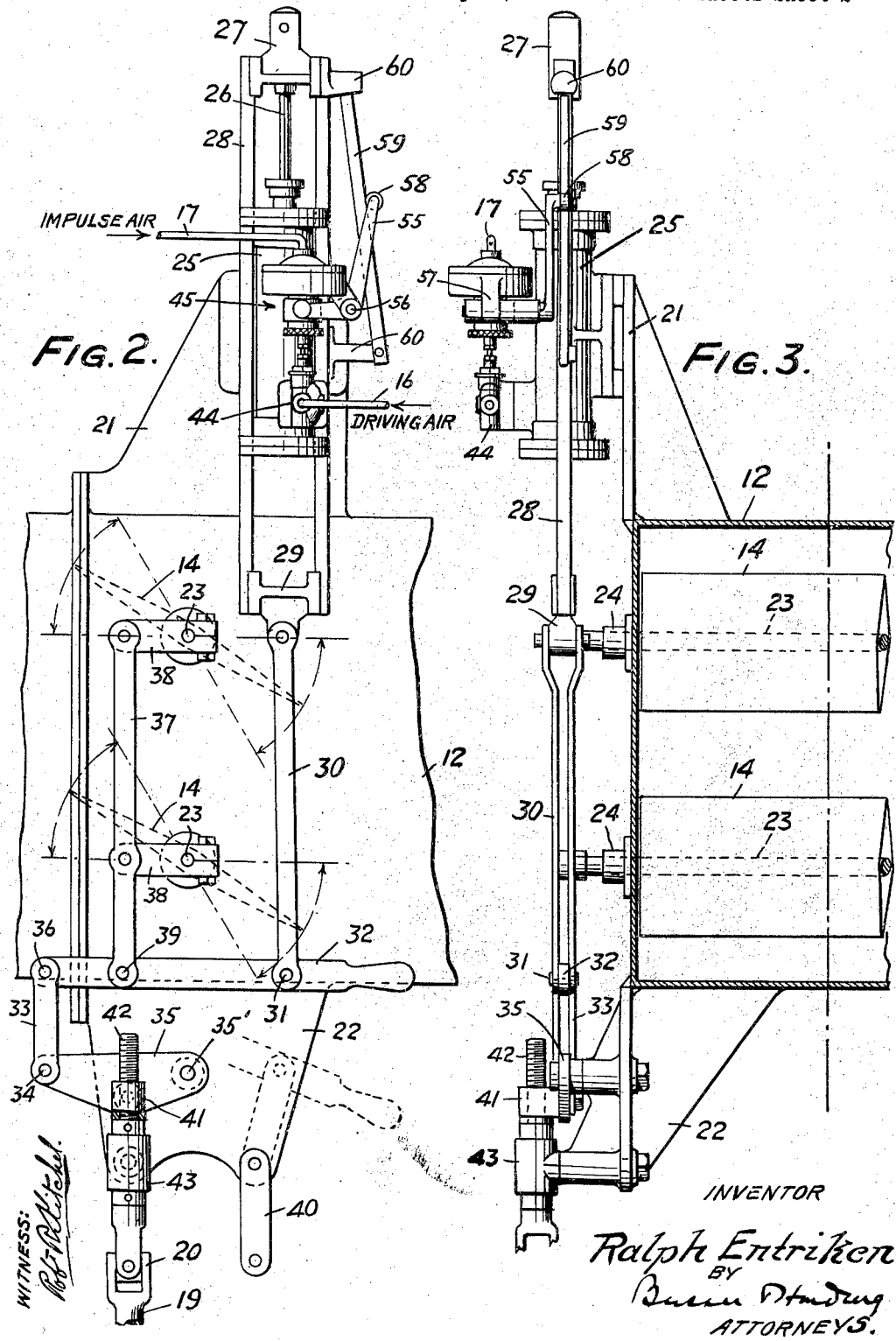

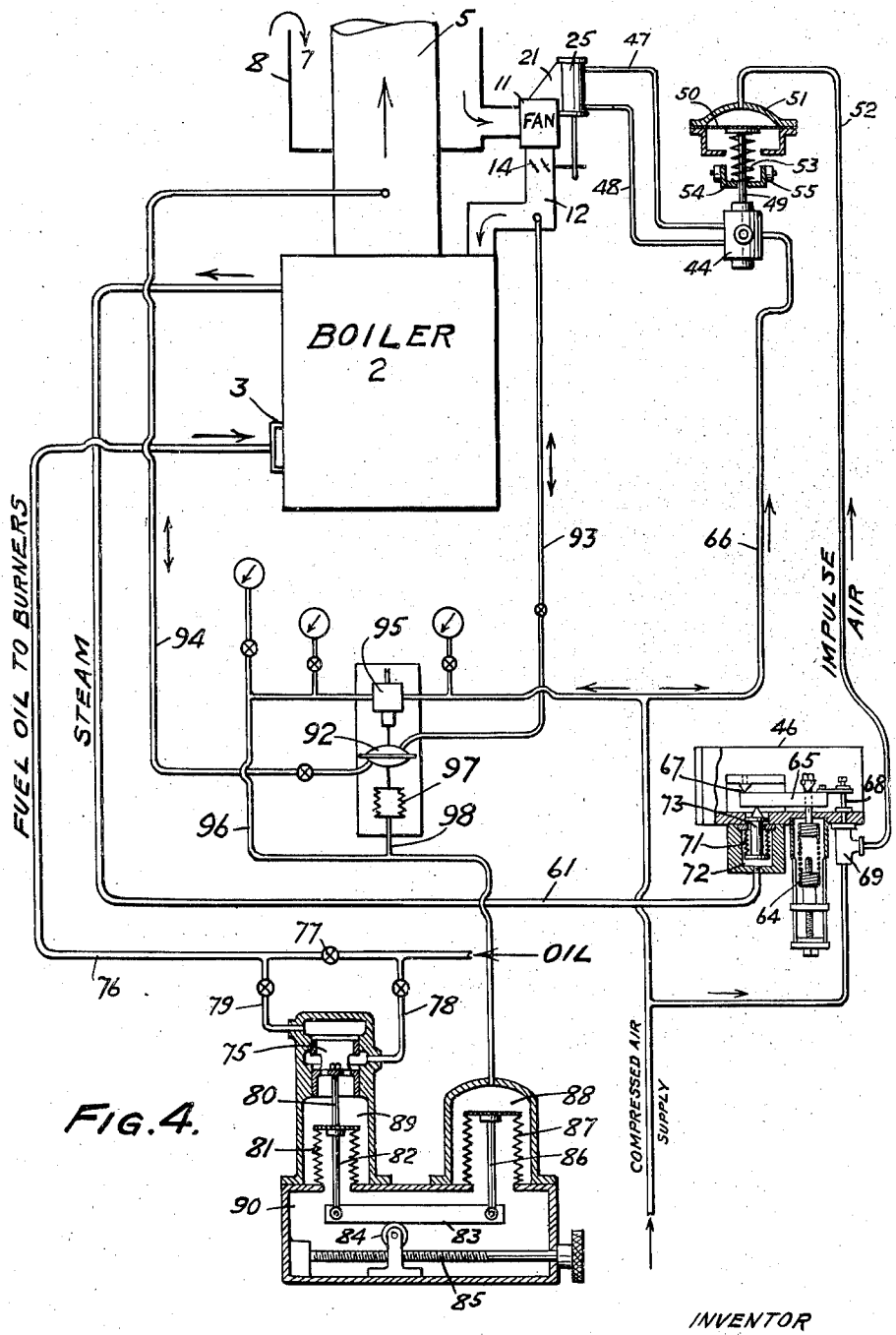

Patented Aug. 19, 1941

2,253,328

UNITED STATES PATENT OFFICE 2,253,328

DAMPER REGULATOR

Ralph Entriken, Philadelphia, Pa., assignor to Sun Shipbuilding & Dry Dock Company, Chester, Pa., a corporation of Pennsylvania Application May 17, 1939, Serial No. 274,083

10 Claims. (Cl. 110—72)

This invention relates to an improvement in means for regulating a damper for the control of the quantity and pressure of air or gas passing through a duct or discharged to or from a blower or fan.

The regulating means in accordance with this invention is constructed so as to be operated automatically and, at the same time, to permit of manual operation for fine adjustment and again in the event of failure of the automatic operating means.

The regulating means in accordance with this invention will have wide general use where it is desired to control the quantity and pressure of air or gas passing through a duct; but it will have particular advantage for the regulation of the amount and pressure of air discharged from a forced draft fan or blower to the furnace or fuel burners in connection with a steam boiler or other apparatus requiring the combustion of fuel in its operation.

More specifically in accordance with this invention where the damper regulator is adapted to the control of the forced draft air to a burner or furnace, it may be advantageously combined with automatic means for controlling the fuel to the burner or furnace so that the heat generated in the furnace may be automatically regulated to meet varying requirements.

The automatic operation of the damper regulator according to this invention may be controlled by any desired means which will be responsive to variation reflecting a necessity for changes in damper adjustment, and where the damper regulator is combined with means for control of the fuel feed to a burner or furnace, such means will be controlled by means responsive to variation resulting from change in damper adjustment effected by the damper regulator.

Specifically, the damper regulator in accordance with this invention and the combination thereof with automatic means for controlling fuel feed will be particularly adaptable for use in connection with the steam boilers of ships, in connection with which in a particular arrangement contemplated as a specific embodiment within the scope of this invention high efficiency of boiler operation, from the standpoint of fuel consumption, is obtained.

Generally speaking, the damper regulator according to this invention, when used in connection with a steam boiler, will be controlled by means responsive to variation in pressure in the main steam line from the boiler. When the regulator is used in combination with means for controlling the fuel feed, the latter means will desirably be controlled by means responsive to variation in the pressure differential between the forced draft air supplied to the furnace and the pressure of hot gases leaving the furnace.

Again, where the regulator is used in connection with a ship's boilers the forced draft blowers will be arranged to draw air from the fire room area up into the fiddley and into a jacket formed about the stack to which the intakes of the blowers, located in the fiddley, are connected and from which the blowers will discharge air into the forced draft ducts. In such arrangement damper regulators in accordance with this invention will operate to control dampers arranged in the forced draft ducts on either the suction or the discharge side of the blowers. The damper regulators may be controlled by variation in the pressure in the main steam line, or otherwise, which will indicate a requirement for more or less forced draft air, and where fuel feed control means are desired such will be advantageously controlled by variation in the difference in pressure in the forced draft ducts from that in the hot gas ducts or in the stack, caused by variation in amount of forced draft air passing the dampers.

Having now indicated in a general way the nature and purpose of this invention, I will proceed to describe a preferred embodiment with reference to the accompanying drawings in which:

Figure 2 is an elevation of a damper regulator according to this invention in association with an air duct equipped with dampers.

Figure 3 is a partial sectional view taken at right angles to the showing of Figure 2.

Figure 4 is a diagrammatic view showing the arrangement of damper regulator and fuel feed control with control means therefor in connection with a steam boiler.

Figure 1:
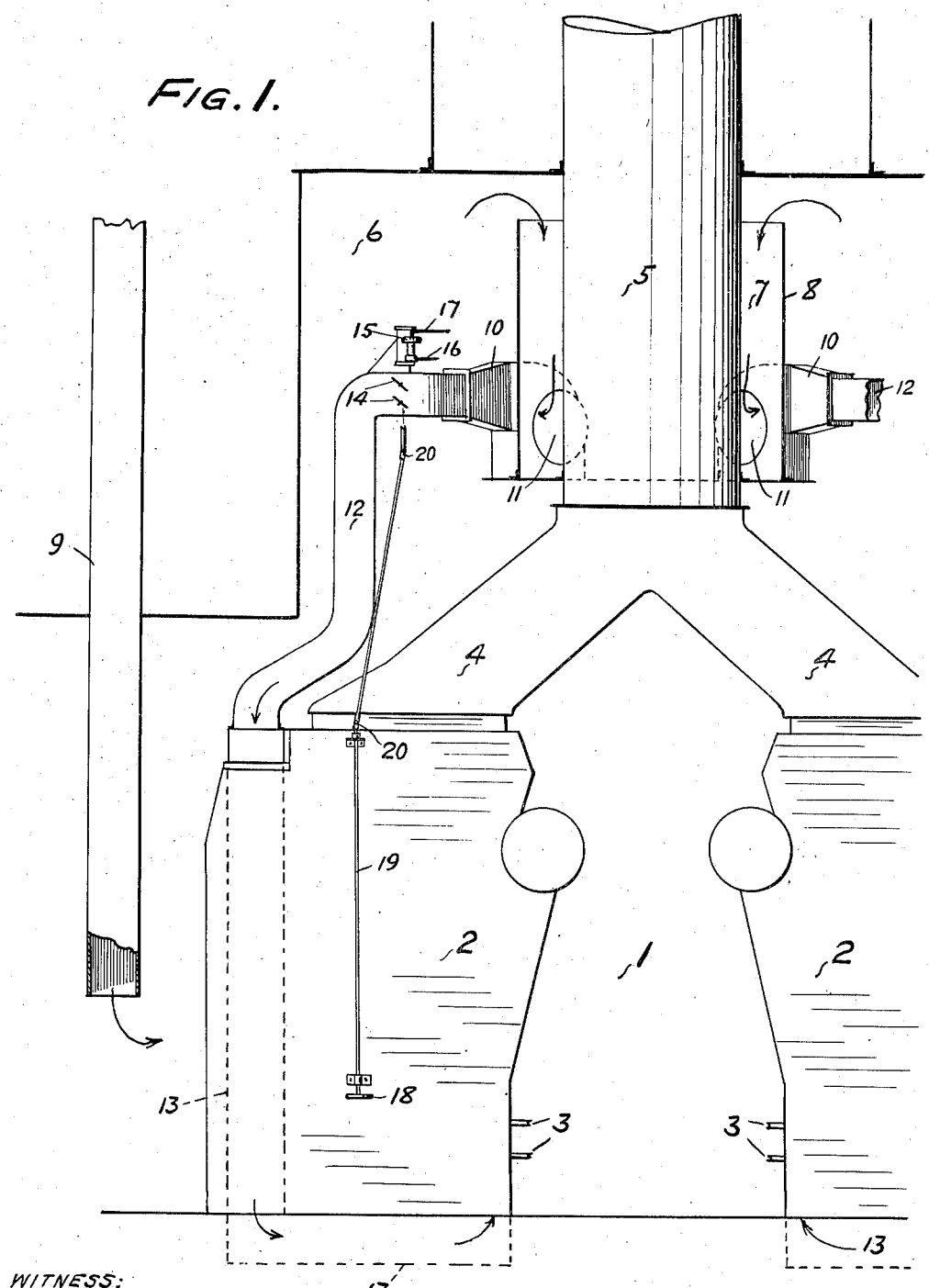
Figure 1 is a diagrammatic view showing the arrangement of damper regulators in accordance with this invention for the control of forced draft air to the furnaces of a ship's boilers.

Referring more particularly to Figure 1, the area 1 represents a ship's fire room containing boilers 2, 2. The boilers are provided with fuel burners 3, 3 extending into furnace areas and the boilers are provided with uptakes 4, 4 for the gases of combustion and which lead to a common stack 5 extending out from the fiddley 6.

Embracing and forming an annular chamber 7 about the base of the stack 5 in the fiddley 6 is a jacket 8. The chamber 7 is closed at its bottom and open at the top, the jacket extending relatively high up the stack in the fiddley.

Downtakes, such as the downtake 9, are provided for the supply of fresh air to the fire room area.

Blowers or fans 10, 10 are arranged with their inlets 11, 11 in communication with the lower part of the chamber 7 and to discharge air into ducts 12, 12 leading to the forced draft duct system 13, 13 in the boilers 2, 2 for the supply of forced draft to the furnaces thereof.

Dampers 14 are arranged in each of the air ducts 12, 12 adjacent to the discharge side of the blowers 10, 10 and a damper regulator 15 is arranged for the control of the dampers in each of the ducts.

The damper regulators, which will be described hereinafter in detail, are adapted to be actuated by fluid pressure supplied, in the case of regulator 15, through a conduit 16, under control of means actuated by fluid pressure supplied through a conduit 17. Further, the damper regulators are adapted to manual operation, in the case of regulator 15, from the hand wheel 18, located for convenient manipulation from the fire room deck and operably connected to the regulator, by means which will be described, through shafting 19 provided with universal joints 20, 20 as variation in its direction necessitates.

Referring now more particularly to Figures 2 and 3, the damper regulator 15 for the dampers 14, 14 in the duct 12, and the operating connections between the regulators and the dampers, and which is typical of the regulator for the dampers in other similar ducts, equipped with similar dampers, for the supply of forced draft air to such number of furnaces as there may be, depending on the number of boilers, are supported from the duct 12 by brackets 21 and 22 secured to the duct.

The dampers 14, 14 are mounted on shafts 23, 23 journaled in bearings 24 in the sides of duct 12.

The regulator comprises a power cylinder 25 supported from bracket 21 and within which is a piston to which the rod 26 is connected. The power cylinder 25 serves as a prime mover. The rod 26 is connected through a cross head 27 to the upper ends of a pair of suitably guided side rods 28, 28, the lower ends of which are connected by a cross head 29, to which is pivotally connected the upper end of a rod or bar 30.

The lower end of rod 30 is connected by a pivot 31 to a lever 32, at a point adjacent to one of its ends, and a link 33, connected by a pivot 34 to one end of a lever 35 pivotally connected at its other end to the bracket 22, is connected to the other end of lever 32 by a pivot 36. The pivotal connection of lever 35 to bracket 22 is formed by pivot 35' which forms a fixed fulcrum for lever 35.

A link 37 pivotally connected to cranks 38 on the ends of the shafts 23 of the dampers 14, 14 is connected by a pivot 39 to lever 32 between its points of connection with the rod 30 and link 33.

A locking piece 40 is pivoted to bracket 22 and is adapted for connection to lever 32 in place of rod 30 in the event that the power cylinder becomes inoperative. The locking piece 40 is of a length such that when engaged with lever 32 it will hold the lever in lowered position in which the dampers 14, 14 will be wide open.

Pivotally secured to lever 35 is a swivel nut 41 through which extends a screw 42 journaled in a swivel bearing 43 pivotally secured to bracket 22 and connected through the universal joint 20 to the shafting 19 carrying the hand wheel 18.

The system of rods, levers, cranks and links just described and which form operative connections between the piston in power cylinder 25 and the dampers 14, 14, and between the hand wheel 18 and the dampers is so proportioned and arranged that when the piston in cylinder 25 is at the bottom of the stroke the dampers are fully open and when it is at its top position the dampers are fully closed, intermediate positions of the piston corresponding to intermediate positions of the dampers.

Now it will be observed that the vertical movement of the side rods 28 up or down under the influence of power applied to the piston in cylinder 25 will effect rotation of the damper shafts 23, 23 for more or less opening or closing of the dampers by applying power to lever 32 through rod 30 which will turn lever 32 on the pivot 36, as a fulcrum, and cause link 37 to turn the cranks 38 on the ends of the damper shafts 23 with resultant adjustment of the positions of the dampers.

At the same time, if desired or necessary to make adjustment of the dampers in addition to the adjustment effected by the power cylinder 25, or independent thereof, such may be accomplished from the fire room floor by manipulation of hand wheel 18, by which shafting 19 is turned one way or the other causing nut 41 to ride up or down on screw 42 to turn lever 35 about its pivotal connection with bracket 22, which results, through link 33, in a turning of lever 32 about the pivot 31, as a fulcrum, with adjustment of the dampers one way or the other through the link 37 and cranks 38.

Finally, if the power cylinder fails entirely, the lever 32 may be locked in its lower or damper open position by means of locking piece 40 and the adjustment of the dampers effected entirely by manipulation of hand wheel 18, which will then cause the lever 32 to turn on the pivot 31 connecting it to the locking piece, as a fulcrum.

The power cylinder may be actuated from any source of power and under any type of control. However, for illustration advantageous operation by compressed air, supplied from a suitable source through a conduit 16 to a valve chamber 44 and control of the valve therein may be exercised by a control device 45, responsive to changes in air pressure or impulses set up by mechanism 46 responsive to, for example, changes in pressure in the main steam line from the boiler, which will reflect the requirements of the furnace for more or less air and consequently for changes in damper adjustment.

Control means for the power cylinder 25 are illustrated in Figures 2, 3, and 4.

In the valve chamber 44, associated with power cylinder 25 and receiving air under pressure through conduit 16, is a pilot valve controlling ports to which passages 47 and 48, respectively, leading to the upper and lower ends of the power cylinder are connected. The valve is connected by a stem 49 to a diaphragm 50 in a chamber 51 connected above the diaphragm by a conduit 52 to the mechanism 46. Surrounding the stem 49 is a spring 53, one end of which bears on the under side of the diaphragm and the other end of which bears in a cup 54 to which the bifurcated end of one arm of a lever 55 is pivotally attached. The lever 55 is fulcrumed on a pin 56, extending from a bracket 57, and its other arm is provided with a roller 58 adapted to follow a cam 59.

The cam 59, which extends at an angle to the direction of movement of the side rod 28, is supported from brackets 60, 60 extending from one of the side rods and moves therewith causing the lever 55 to turn on the pivot 56, as the rods move up or down, and to increase or decrease the tension on spring 53.

Assuming that the pressure in chamber 51 is at a minimum and the piston in power cylinder 25 is at the bottom of its stroke with the dampers 14, 14 in open position, it will be clear that increase of pressure in the chamber 51 will depress the diaphragm until the resultant compression of springs 53 equals the pressure in chamber 51. The movement of the diaphragm causes a downward movement of the stem 49 and a downward movement of the valve in valve chamber 44, which permits compressed air to enter the bottom of power cylinder 25 through passage 48. The piston in cylinder 25 will then move upwardly causing side rods 28 and the cam 59 to move upwardly, effecting a closing movement of the dampers 14. The upward movement of the cam 59 will turn the lever 55 outwardly, causing the cup 54 to be lifted to increase the tension on spring 53 until it returns the diaphragm to its original position with resultant movement of the valve to closed position to shut off the air from the lower end of cylinder 25 and the movement of the piston stops. Successive increases in pressure in chamber 51 cause upward movements of the piston in cylinder 25, in the manner described.

With the piston in cylinder 25 at a position above its lowermost position a decrease in the pressure in chamber 51 will allow the spring 53 to move the diaphragm upward resulting in a movement of the valve in chamber 44 to open passage 48 and permit compressed air to enter the top of cylinder 25 and move the piston downwardly. The downward movement of the piston causes the side rods and cam 59 to move downwardly. The downward movement of cam 59 permits lever 55 to turn inwardly, lower cup 54 and release tension on spring 53 until it permits the diaphragm to return to a position to shut off air from the top of the cylinder 25 and the movement of the piston ceases.

Provision is made for release of pressure on the side of the piston opposite to that to which power is applied. Thus, the operation of the power cylinder 25 to effect adjustment of the dampers 14 is controlled by variation of pressure in chamber 51 above the diaphragm 50. The spring 53 and the lever 55 controlled by the cam 59 act to compensate for the effect of changes of pressure on the diaphragm and of consequent changes in the position of the valve controlling the admission of air to the cylinder 25 in predetermined movements of the piston in either direction. The angle of the cam 59 determines the relation between the stroke of the piston and the impulse pressure operative upon the diaphragm 50.

Variation in the pressure in chamber 51, or impulse pressure controlling the operation of cylinder 25 and resultant damper adjustment may be provided by the mechanism 46 in response to variation in the pressure in the main steam line from the boiler, to which the mechanism is connected by a steam conduit 61.

The mechanism 46 may be of any desired construction, but preferably will be constructed as shown in Figure 4. Thus, the mechanism 46 will comprise a lever 65 fulcrumed at 67 and connected to the stem 68 of a valve in casing 69. The casing 69, is, as will be observed, in the impulse air line 52 leading to diaphragm 50 and is adapted to open and close that line to atmosphere, whereby impulses will be set up in line 52.

The lever 65 is weighted by means of spring 64 and is adapted to be moved against spring 64 under the influence of steam pressure in line 61, through the medium of a Sylphon bellows 71 in a chamber 72, into which steam line 61 leads, and with which is connected a plunger 73, which bears against the lever 65.

In operation the mechanism 46 will be actuated by the steam pressure in line 61 to open or close the valve in casing 69 for increase or decrease of pressure on the diaphragm 50 through line 52. Thus, assuming the dampers 14 to be wide open and that there is a minimum pressure in chamber 51 on diaphragm 50, the valve in casing 69 will be in a position more or less opening the impulse air line 52 to atmosphere and the valve in casing 44 will be in a position such that the piston in power cylinder 25 will be in its lower position.

With the dampers wide open the steam pressure in the boiler, under normal conditions, will increase and acting on the Sylphon bellows 71, through steam line 61, will raise the lever 65, against the action of spring 64, thus effecting a movement of the valve in casing 69 to shut off line 52 from atmosphere and cause an impulse, or increase in pressure, on diaphragm 50, which in turn will cause the valve in casing 44 to move to a position to admit compressed air beneath the piston in power cylinder 25, causing an upward movement thereof and a closing movement of the dampers 14.

With decrease in pressure in the boilers the spring 64 acting on lever 65 will cause a movement of the valve in casing 69 to more or less open impulse line 52 to atmosphere with consequent reduction in pressure on diaphragm 50 and resultant movement of the valves in casing 44 to effect an opening movement of the dampers 14.

As will be appreciated the seating of the valve in casing 69 and the power of spring 64 with reference to the range of pressures acting on the Sylphon bellows 71 will be adjusted to effect the operation of the valve in casing 44 through the diaphragm 50 for desired control of the dampers 14.

As has been indicated, the supply of fuel oil from the supply, not shown, to burners 3 may be automatically controlled simultaneously with control of the forced draft. To such end a valve 75 is arranged to control the amount of oil passing from the source of supply through conduit 76 to the burners 3 in one of the boilers. The conduit 76 provided with a valve 77, which may be opened for direct passage of fuel oil from the supply to the burners and which when closed causes the fuel oil to pass through conduit 78 under control of the valve 75. The stem 80 of valve 75 is connected to a bellows 81, around which is an enclosed chamber 89, which in turn is connected by a link 82 to one end of a lever 83, which is provided with a fulcrum 84 adjustable by means of a screw 85.

The lever is positioned within an enclosed chamber 90, which opens into the interior of the bellows 81. The other end of the lever 83 is connected by a link 86 to a bellows 87 opening into chamber 90 and about which is provided an enclosed chamber 88.

The valve 75, as will now be observed, is actuated by the pressure in chamber 88 upon the bellows 87. Thus, if the pressure in chamber 88 be increased the bellows will be more or less collapsed, which will result in depression of the valve and lifting of the lever 83, which will effect an upward movement of the valve 75 to more or less increase the amount of fuel flowing therethrough. The bellows within chamber 89 is subjected to the pressure of the oil passed through the valve, since the chamber 89 is in communication with the valve chamber through the openings 91 and this pressure acting on the bellows will act to bring the valve to rest when the bellows 81 has been expanded to an extent to balance the increased pressure on the bellows 87.

If decrease in pressure in chamber 88 occur, the bellows 81 will be collapsed under the oil pressure in chamber 89 with the result that the lever 83 will be turned in the opposite direction causing a downward movement of the valve 85, with more or less reduction in the amount of fuel, and expansion of the bellows 81, the valve being again stopped when the pressure in chamber 88 acting on bellows 87 balances the pressure on the bellows 81, which, as the flow of fuel is reduced, is decreased.

The pressure in chamber 88 is controlled by means of a control device comprising a casing 92 containing a diaphragm. The casing 92 above the diaphragm is connected by means of a conduit 93 with the forced air draft conduit at a point between the dampers 14 and the boiler. The lower portion of the casing 92 below the diaphragm therein is connected by a conduit 94 with the stack 5 adjacent its point of juncture with the ducts 4. The diaphragm is connected for operation of a valve within a casing 95 adapted to control the passage of air under pressure through conduit 96 to the chamber 88. The diaphragm is also connected to a bellows 97, the interior of which is in communication with the conduit 96 through conduit 98.

As will be understood, the differential between the pressures in the forced draft conduit 12 and in the stack adjacent its juncture with the ducts 4 will change with increase or decrease in the forced draft air passing through the dampers 14. When the operation of the mechanism for control of the dampers, heretofore described, effects opening of the dampers, the increased pressure in the conduit 12, effective on the top of the diaphragm in the casing 92, through the conduit 93, will depress the diaphragm in the casing 92, which will result in an adjustment of the valve in the casing 95 to increase the pressure in the chamber 88 about the bellows 87.

The pressure in bellows 97 will be increased through the conduit 98 and the bellows will expand and bring the valve in casing 95 to rest, by a balancing of the pressures effective above and below it. The air under pressure admitted to the chamber 88 will, as has been described, more or less collapse the bellows 87, which will result in an upward movement of the valve 75, which will permit the passage of more fuel oil through the conduit 76 to the burners 3, 3.

Conversely, if the dampers be more or less closed to cut down the forced draft air, the diaphragm in casing 92 will operate to impart a closing action to the valve in the casing 95, with the result that the pressure in chamber 88 will be reduced and the lever 83 will be turned, under the pressure in chamber 89 acting on bellows 81, to give the valve 75 a downward movement to reduce the supply of fuel oil to the burners.

This mechanism will be arranged and adjusted so that desired increase or decrease in the amount of fuel oil supplied to the burners will be automatically obtained with reference to and in proportion to increase or decrease in the forced draft air supplied through the conduit 12.

It will be understood that the above detailed description illustrative of a specific embodiment of this invention and of adaptation to a particular use, given for the purpose of illustration, is not intended to be limiting upon the scope of the invention inasmuch as it will be obvious that various modification in detail may be made without departing from the scope of the invention.

What I claim and desire to protect by Letters Patent is:

1. Means for controlling the flow of a gas through a conduit comprising, in combination, a damper, a prime mover, an operative connection between the damper and the prime mover and manually operable means connected to said operative connection, said operative connection being operable by the manually operable means and by the prime mover independently.

2. Means for controlling the flow of a gas through a conduit comprising, in combination, a damper, a prime mover, an operative connection between the damper and the prime mover, manually operable means connected to said operative connection, said operative connection being operable by the manually operable means and by the prime mover independently and automatically operable means for controlling operation of the prime mover.

3. Means for controlling the flow of a gas through a conduit comprising, in combination, a damper rotatably mounted within the conduit, a prime mover, a crank connected to the damper, a pair of levers, a link connecting said levers, a link connecting one of said levers with said crank, a link connecting one of said levers with said prime mover and manually operable means for applying power to one of said levers to effect operation of said crank independently of said prime mover.

4. Means for controlling the flow of a gas through a conduit comprising, in combination, a damper rotatably mounted within the conduit, a prime mover, a crank connected to the damper, a pair of levers, a link connecting said levers, a link connecting one of said levers with said crank, a link connecting one of said levers with said prime mover, and manually operable means for applying power to one of said levers, said levers and links being so arranged that said damper may be rotated by the application of power from said prime mover or by the application of power from said manually operable means to effect operation of said crank independently of said prime mover.

5. Means for controlling the flow of a gas through a conduit comprising, in combination, a damper, rotatably mounted within the conduit, a prime mover, a crank connected to the damper, a lever having a fixed fulcrum adjacent one of its ends, manually operable means for applying power to said lever, a second lever, a link connecting said levers, a link connecting said second lever with the prime mover and a link connecting the second lever with said crank, said second lever being adapted when power is applied to it from the prime mover and the manually operable means remains stationary to turn on its connection with said first mentioned lever as a fulcrum, and to turn on its connection with the prime mover as a fulcrum when the prime mover remains stationary and power is applied to it through its connection with said first lever on application of power to said first lever through said manually operable means.

6. Means for controlling the flow of a gas through a conduit comprising, in combination, a damper rotatably mounted within the conduit, a prime mover, a crank connected to the damper, a pair of levers, a link connecting said levers, a link connecting one of said levers with said crank, a link connecting one of said levers with said prime mover, manually operable means for applying power to the other of said levers, said levers and links being so arranged that said damper may be rotated by the application of power from said prime mover or by the application of power from said manually operable means and means for securing said links and levers in a position with respect to the prime mover such that the damper will be in an open position and permitting adjustment of the damper only by said manually operable means.

7. Means for the control of forced draft air to a furnace comprising, in combination, a blower, a conduit leading from the blower to a furnace, a pair of damper members rotatably mounted in said conduit and arranged to cooperate to control a flow of air from the blower through said conduit, a prime mover supported adjacent said conduit, cranks connected to said damper members, a lever turnable on a fixed fulcrum, manually operable means for turning said lever, a second lever, a link connecting one end of said second lever to said first lever, a link connecting the other end of said second lever to said prime mover and a link connecting said cranks to said second lever whereby on the application of power to said second lever from said prime mover or by turning of said first lever said damper members may be adjusted.

8. Means for the control of forced draft air to a furnace comprising, in combination, a blower, a conduit leading from the blower to a furnace, a damper rotatably mounted in said conduit and arranged to control a flow of air from the blower through said conduit, a prime mover supported adjacent said conduit, a crank connected to said damper member, a lever turnable on a fixed fulcrum, a nut pivoted to said lever, a screw engaged with said nut, manually operable means for turning said screw to cause said lever to turn on its fulcrum, a second lever, a link connecting one end of said second lever to said first lever, a link connecting the other end of said second lever to said prime mover, and a link connecting said crank to said second lever whereby on the application of power to said second lever from said prime mover or by rotation of said first lever said damper member may be adjusted.

9. Means for the control of forced draft air to a furnace comprising, in combination, a blower, a conduit leading from the blower to a furnace, a pair of damper members rotatably mounted in said conduit and arranged to cooperate to control a flow of air from the blower through said conduit, a prime mover supported adjacent said conduit, cranks connected to said damper members, a lever turnable on a fixed fulcrum, manually operable means for turning said lever, a second lever, a link connecting one end of said second lever to said first lever, a link connecting the other end of said second lever to said prime mover, a link connecting said cranks to said second lever whereby on the application of power to said second lever from said prime mover or by rotation of said first lever said damper members may be adjusted and means for securing said second lever in a position such that the damper members will be adjusted to open position and for rendering said second lever operable only through the medium of said manually operable means independently of said prime mover.

10. Means for the control of forced draft air to a steam generator in association with a furnace comprising, in combination, a blower, a conduit leading from the blower to a furnace, a pair of damper members rotatably mounted in said conduit and arranged to cooperate to control a flow of air from the blower through said conduit, a prime mover supported adjacent said conduit, cranks connected to said damper members, a lever turnable on a fixed fulcrum, manually operable means for turning said lever, a second lever, a link connecting one end of said second lever to said first lever, a link connecting the other end of said second lever to said prime mover, a link connecting said cranks to said second lever whereby on the application of power to said second lever from said prime mover or by rotation of said first lever said damper members may be adjusted and means for automatically controlling the actuation of said prime mover with variation in the pressure in said steam generator.

RALPH ENTRIKEN.